United States Patent [19]

Takayama

[11] Patent Number: 5,311,370
[45] Date of Patent: May 10, 1994

[54] RECORDING APPARATUS HAVING CONTINUAL AND SINGLE-MEMORY-PORTION RECORDING MODES

[75] Inventor: Makoto Takayama, Kawasaki, Japan

[73] Assignee: Canon Kabushiki Kaisha, Tokyo, Japan

[21] Appl. No.: 396,969

[22] Filed: Aug. 22, 1989

[30] Foreign Application Priority Data

Aug. 23, 1988 [JP] Japan .................. 63-207256

[51] Int. Cl.$^5$ .......................................... H04N 5/76
[52] U.S. Cl. ................... 360/9.1; 360/19.1; 360/31; 360/35.1; 360/61
[58] Field of Search ......... 360/8, 60, 61, 10.1, 360/10.3, 19.1, 35.1, 9.1, 31; 369/24, 25

[56] References Cited

U.S. PATENT DOCUMENTS

| | | | |
|---|---|---|---|
| 4,531,161 | 7/1985 | Murakoshi | 360/10.1 |
| 4,546,390 | 10/1985 | Konishi et al. | 360/10.3 |
| 4,802,020 | 1/1989 | Miyake et al. | 360/35.1 X |
| 4,839,857 | 6/1989 | Mersiovsky et al. | 369/25 |
| 4,912,570 | 3/1990 | Kinoshita et al. | 360/8 |
| 4,931,878 | 6/1990 | Takei et al. | 360/35.1 |
| 4,965,675 | 10/1990 | Hori et al. | 360/19.1 |
| 4,982,305 | 1/1991 | Asano et al. | 360/69 |

Primary Examiner—W. R. Young
Attorney, Agent, or Firm—Fitzpatrick, Cella, Harper & Scinto

[57] ABSTRACT

A recording apparatus comprises: a supplying device to supply a voice signal; a circuit to store the voice signal supplied by the supplying device into a memory having a plurality of memory blocks such as tracks; and a control circuit to control the storing circuit. The control circuit can switch between a first mode in which, after the voice signal was stored into a predetermined block in the memory, the control circuit is set into a standby mode and a second mode in which the storing of the voice signal is continued until an arbitrary block in the memory. The apparatus further has a time base compression circuit to time base compress the voice signal. With the apparatus, in the after-recording mode to record the voice signal after the video signal which has already been recorded on a recording medium, a desired voice signal can be recorded by a simple operation. Even if an image signal for after recording was changed during the after recording of a voice, the apparatus can easily cope with such a change.

10 Claims, 8 Drawing Sheets

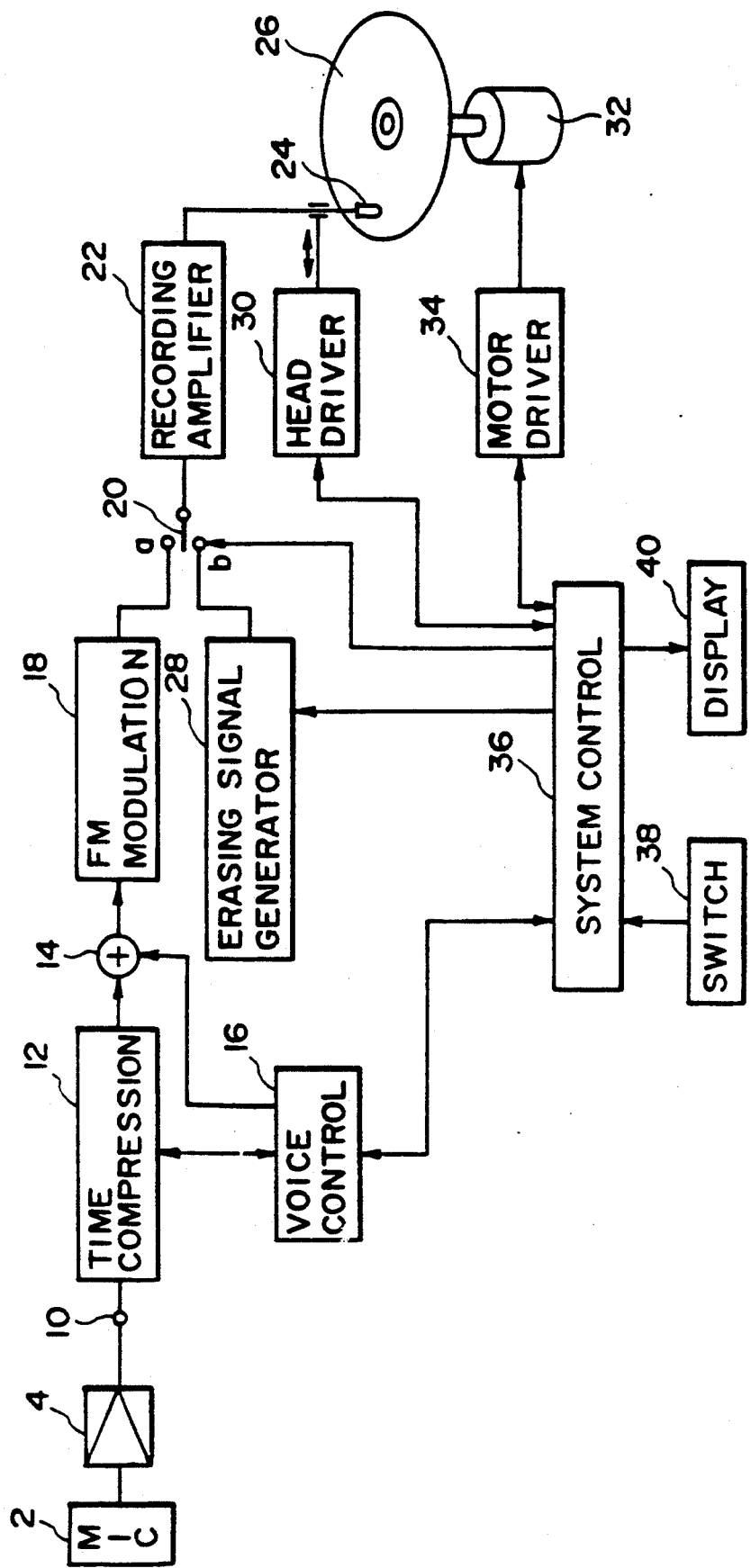
FIG. IA

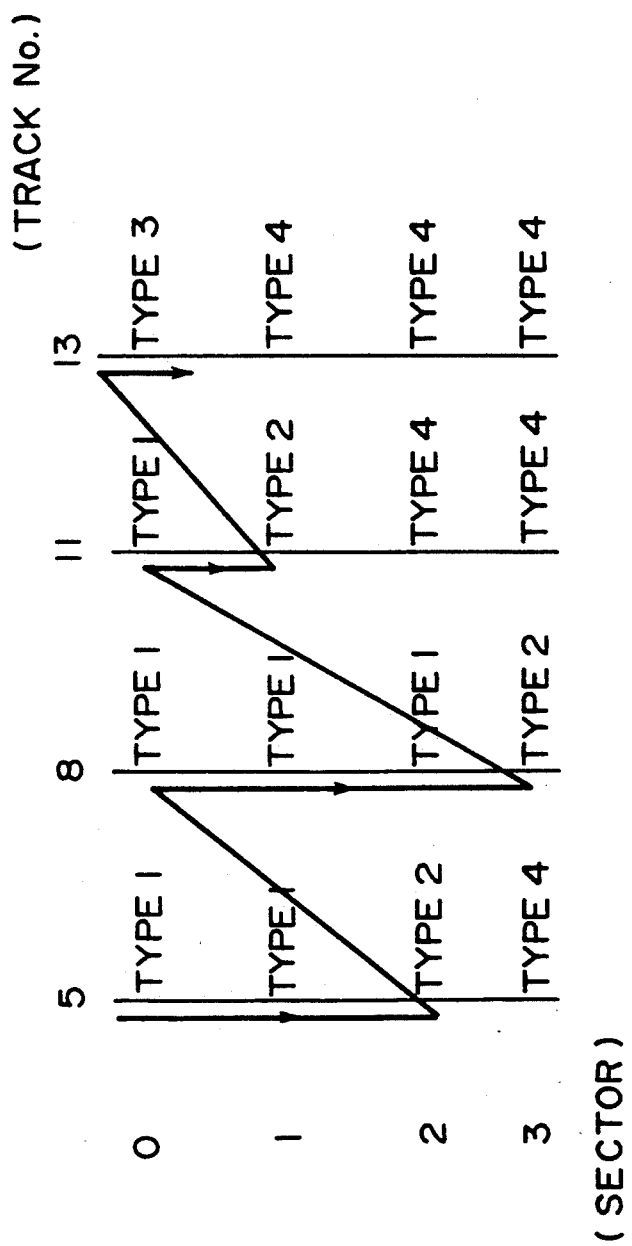
F I G. 5

RECORDING APPARATUS HAVING CONTINUAL AND SINGLE-MEMORY-PORTION RECORDING MODES

BACKGROUND OF THE INVENTION

1. Field of the Invention

The present invention relates to a recording apparatus for recording a voice signal.

2. Related Background Art

Hitherto, when a voice signal is recorded, for instance, there are considered two systems: a first system in which recording is executed while automatically updating a recording area of a recording medium; and a second system in which a recording area is not updated, but in the case of recording a predetermined amount of a voice signal, recording is automatically stopped.

However, in a mode to record for ten seconds per block, the voice signal is recorded the next track after the elapse of ten seconds. If an original is read and the recording is continued without regard to a length of the voice signal, the recording is successively executed to the other subsequent blocks every ten seconds, and a number of blocks will have been used in vain. Therefore, there is also considered a method whereby after an original was completely read within ten seconds, by depressing a stop button, recording in the next block can be prevented. However, in such a method, the operations are complicated and the user needs to be familiar with the operation.

SUMMARY OF THE INVENTION

In consideration of the above points, it is the first object of the present invention to provide a recording apparatus which can record a desired voice signal on a medium by a simple operation.

Another object of the invention is to provide a recording apparatus which can record a desired voice signal by a simple operation in an after-recording mode to add and record a voice signal after a video signal which has already been recorded on a recording medium.

According to a preferred embodiment of the invention, there is disclosed a recording apparatus for a recording medium to which a voice signal can be freely recorded, wherein the recording apparatus has: a first voice recording mode in which the apparatus is set into a standby mode after a voice signal of a predetermined block was recorded; and a second recording mode in which the recording of the voice signal is continued until an arbitrary block.

Still another object of the invention is to provide a recording apparatus in which in the case where a corresponding image signal was changed during after-recording of a voice, the recording apparatus can preferably cope with such a change.

Another object of the invention is to provide a novel recording apparatus which is adapted to the still video format standard.

The above and other objects and features of the present invention will become apparent from the following detailed description and the appended claims with reference to the accompanying drawings.

BRIEF DESCRIPTION OF THE DRAWINGS

FIG. 1A is a block diagram of voice recording and erasing systems in a still video recording system;

FIG. 5 shows an example of a change of a recording type of a voice sequence.

DETAILED DESCRIPTION OF PREFERRED EMBODIMENTS

Figure 6:
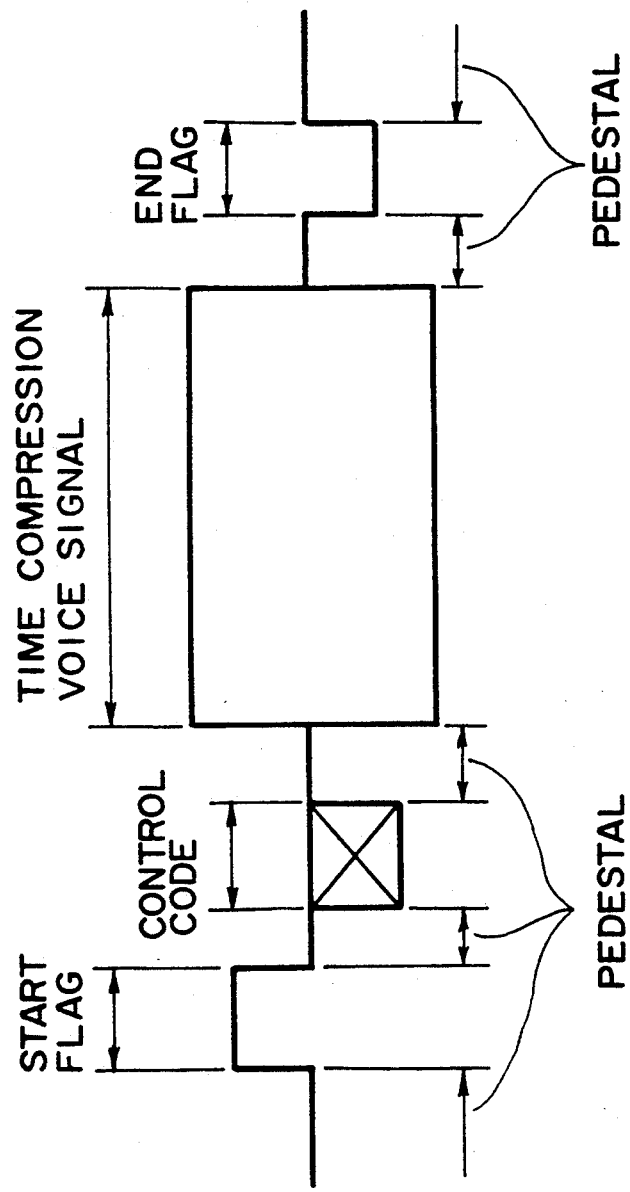
FIG. 6 shows a sector format of a voice signal.

Prior to explaining an embodiment, an example of a recording system which is used in an apparatus of the embodiment will be first described. In the Conference of in Electronic Still Video, a format in for recording a still image and a voice signal on a still video floppy disk was standardized. According to such a format, a video signal is recorded onto one circular track per field, and two tracks are used with respect to the video signal of one frame. On the other hand, a voice signal is time base compressed by a digital processing technique and its frequency band is raised to the band of the video signal and the voice signal is then recorded by using the same recording processing system as that of the video signal. In the case of the voice signal, one track comprises four sectors #0 to #3 of four types provided with respect to method. That is, type 1 denotes that the sector continues to the next sector of the same track. Type 2 means that the recording of the track is finished and the sector continues to the first sector #0 of the subsequent track of the sequence. Type 3 denotes the end of sequence. Type 4 means unused sectors or the remaining sectors in the types 1 to 3 of the track. As shown in FIG. 6, in each sector, a start flag is arranged before the time base compressed voice signal, and an end flag is arranged thereafter. The above types are discriminated by a combination of the start flag and end flag.

TABLE 1

| Word | Data |
|---|---|
| $W_0$ | Track number |
| $W_1$ | Head voice track number of the sequence |
| $W_2$ | Subsequent voice track number |
| $W_3$ | Corresponding video track number |
| $W_4$ | Unused |
| $W_5$ | Time base compression ratio |
| $W_6$ | Day |
| $W_7$ | Month |
| $W_8$ | Year |

One sequence of the voice signal starts from the sector of type 1 and ends at the sector of type 3. FIG. 5 shows the type of each sector in the case where one voice sequence was recorded onto four tracks.

Each sector also includes a control code to control the sequence of the voice signal and its content is shown in Table 1. One sequence of the voice signal can be regenerated as a coutinuous sound by the control code. On the other hand, one still image is assigned to one track and the voice can be regenerated while reproducing the still image.

Such a recording system has been shown as an example of recording systems to which the invention should be applied and other various kinds of recording systems can also be obviously used.

Figure 1B:
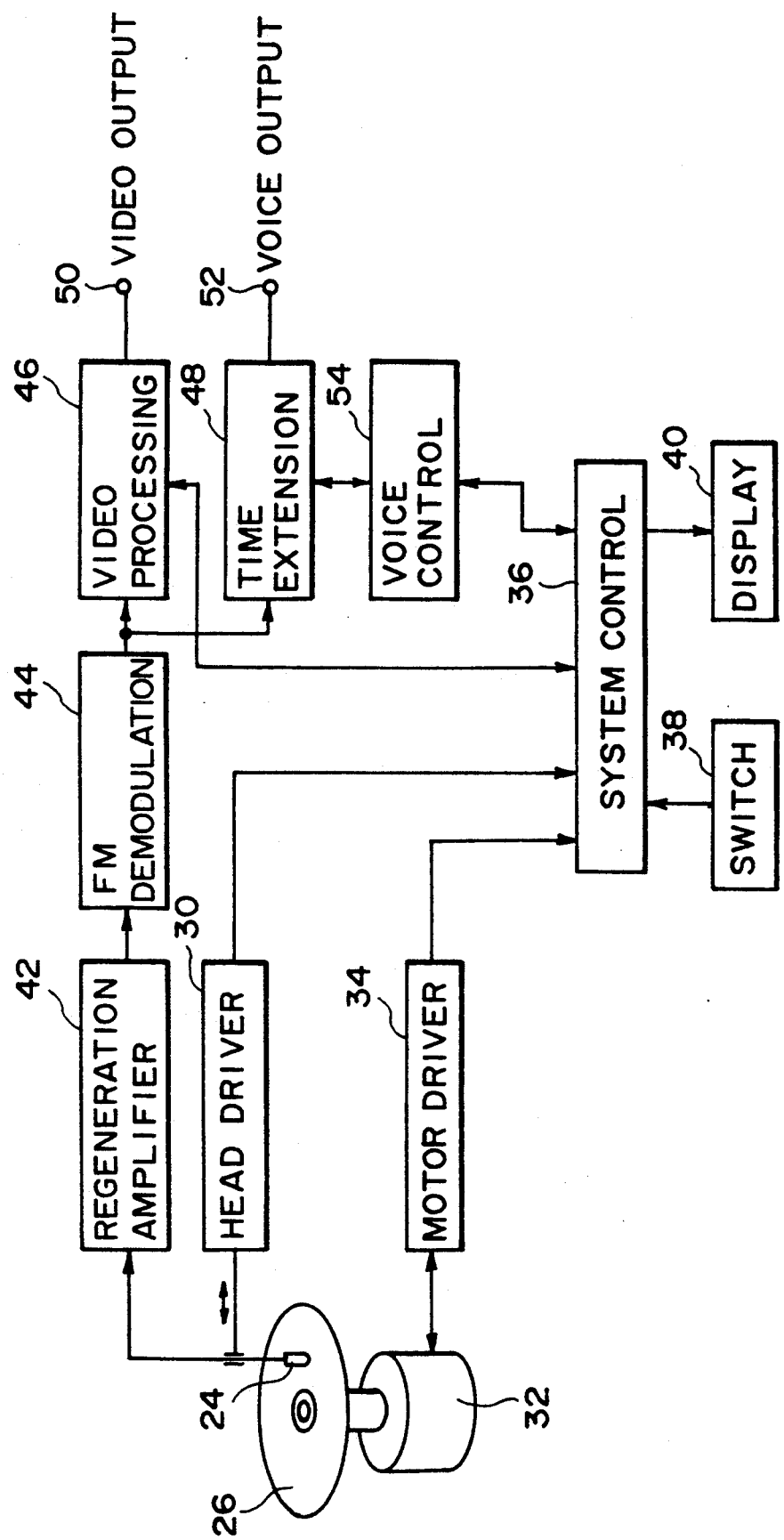
FIG. 1B is a block diagram of a system for reproducing video and voice signals.

An embodiment of the invention will now be described hereinbelow with reference to the drawings. FIG. 1A shows a block diagram of recording and erasing systems of a voice signal in a still video recording and reproducing apparatus. FIG. 1B shows a constructional block diagram of a reproducing system for a voice signal and a video image. In FIG. 1A, an analog voice signal at an input terminal 10 is input to a time compression circuit 12. Under the control of a voice control circuit 16, the time compression circuit 12 compresses the voice input (converts it into the video band) at a designated time base compression ratio. An adder 14 adds the start flag, control code, and end flag from the voice control circuit 16. An output of the adder 14 is frequency modulated by an FM modulation circuit 18 and is recorded onto a magnetic disk 26 as a still video floppy through a switch 20, a recording amplifier 22, and a magnetic head 24. The switch 20 is connected to a contact a in the recording mode and is connected to a contact b in the erasing mode. Reference numeral 28 denotes an erasing signal generator to generate a recording/erasing signal; 30 indicates a head driver to move the magnetic head 24 in the radial direction of the magnetic disk 26; 32 is a disk motor; 34 is a motor driver to drive the motor 32; 36 is a system control circuit to integrally control each section in the circuit shown in the diagram; 38 is a switching device comprising various switches to give a head movement command, an after-recording command, a stop command, a pause command, a start command, a continuous recording mode command, and a single recording mode command; and 40 is a display device. Reference numeral 2 indicates a microphone to input a voice and 4 represents an amplifier.

In FIG. 1B, a signal reproduced from the magnetic disk 26 by a magnetic head 24 is applied to an FM demodulation circuit 44 through a regeneration amplifier 42. The signal demodulated by the FM demodulation circuit 44 is supplied to a video processing circuit 46 and a time extension circuit 48. The video processing circuit 46 reproduces the signal from the video track and outputs the still image video signal to an output terminal 50. The time extension circuit 48 time base extends the signal from the voice track and returns it to the original signal and outputs the reproduction voice signal to an output terminal 52. Reference numeral 54 denotes a voice control circuit to control the time extension circuit 52. The other circuit elements which are common to those shown in FIG. 1A are designated by the same reference numerals. The time base compression and extension are executed by using a memory and changing a combination of a writing and reading speeds into/from the memory.

Figure 2:
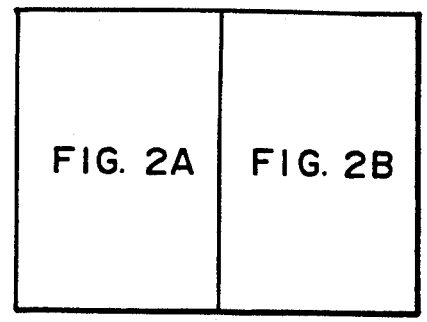
FIGS. 2, 2A and 2B are flowcharts in an after-recording mode.
Figure 2B:
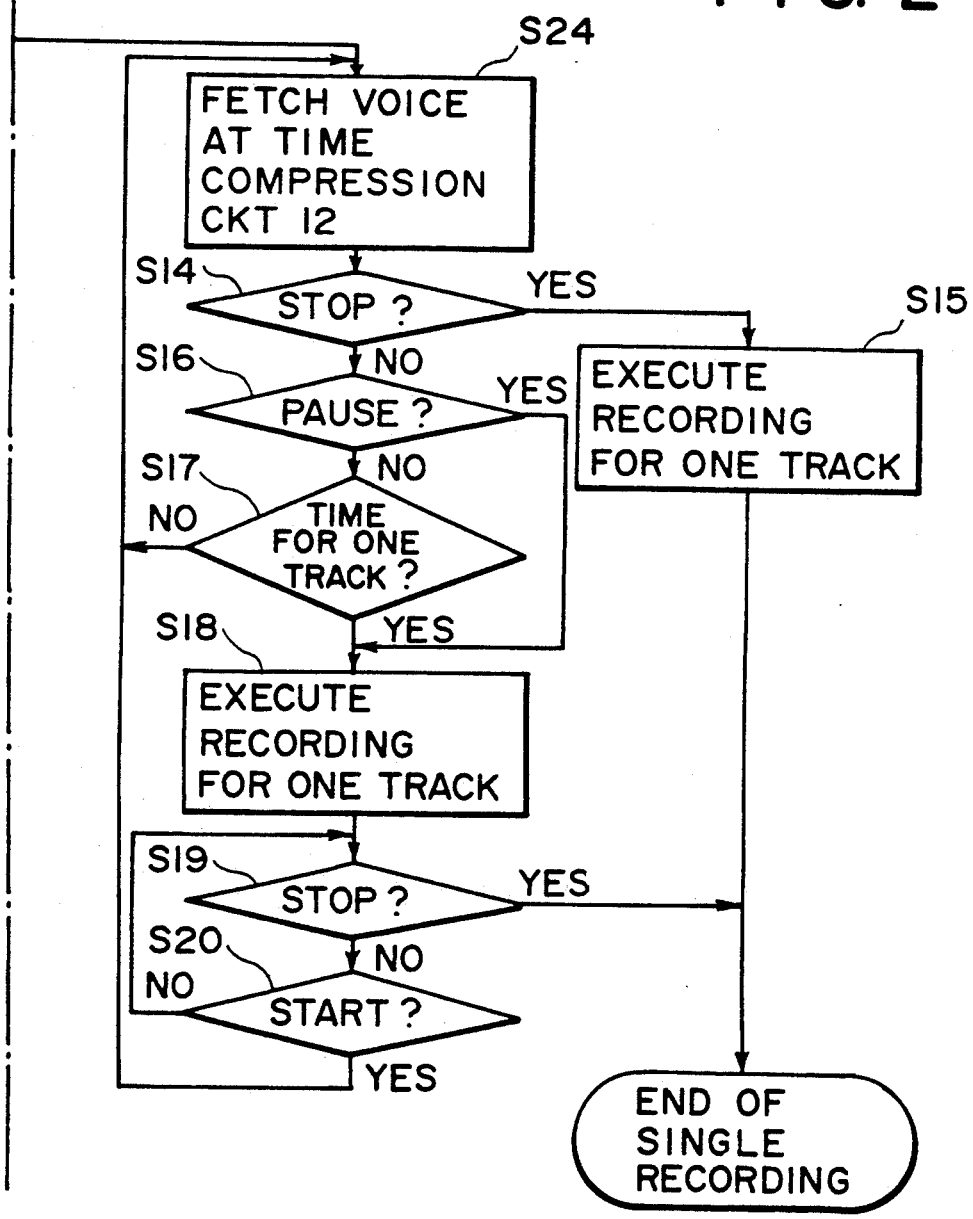
Figure 2A:
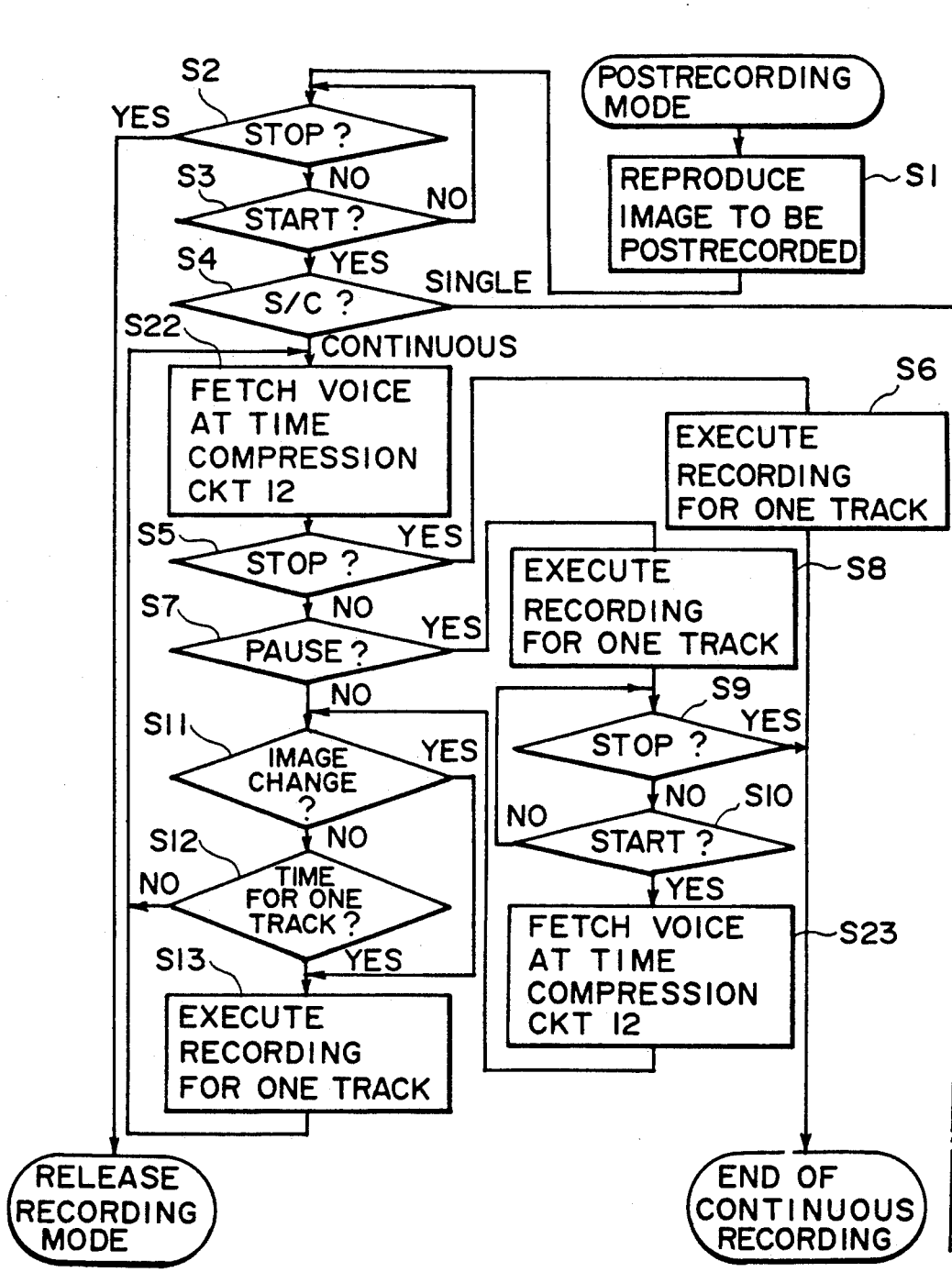

FIG. 2 shows a flowchart in the after-recording mode in the embodiment. When the operating mode is set into the after recording mode, a head movement command is given to the head driver 30 and an image to be after-recorded is reproduced (S1). The apparatus waits until a start button is depressed (S3). When the start button is depressed, a check is made to see if the operating mode has been set into the continuous recording mode or the single recording mode (S4). If a stop button is depressed in the standby mode, the after-recording mode is released (S2).

In the continuous recording mode, a voice signal is fetched into the time compression circuit 12 (S22). When the stop button is depressed (S5), the voice signal of the time compression circuit 12 for the period of time from the depression of the start button (S3) to the depression of the stop button (S5), or from the completion of the recording of the signal of one track (S13) to the depression of the stop button (S5) is recorded onto the magnetic disk 26 by the amount of one track (S6). Then, the continuous recording mode is finished. If a pause button has been depressed (S7) without depression of the stop button, the voice signal fetched into the time compression circuit 12 until the pause button is depressed is recorded by the amount of one track (S8). In this case, the recording type of the sector is set to type 2. After that, the apparatus waits until either the start button or stop button is depressed. If the stop button has been depressed, the continuous recording mode is finished (S9). In this case, the recording type may be changed to type 3. On the other hand, if the start button has been depressed, the fetching of the voice signal into the time compression circuit 12 is restarted (S23).

In steps S5 and S7, if neither the stop button nor the pause button is depressed (S5, S7), a check is made to see if the image for after recording has been changed or not (S11). That is, a check is made to see if the image has been changed or not. If the image has been changed, the voice signal fetched in the time compression circuit 12 until it is discriminated in step S11 that the image for after-recording was changed after the start button (S3 or S10) had been turned on is recorded (S13). Then, the processing routine is returned to step S12 and the fetching of the voice into the time compression circuit 12 is continued. In this case, the recording type of the sector is set to type 2. If the image for after-recording is not changed, a check is made to see if a time for recording of one track has elapsed or not (S12). If NO in step S12, the processing routine is returned to step S22. If YES in step S12, the voice signal is recorded onto the magnetic disk 26 (S13) and the processing routine is returned to step S12. The recording type in this case is set to type 2.

When the start button is depressed, the time compression circuit 12 newly starts the fetching of the voice signal at the input terminal 10. The fetching is finished by operating the stop button or pause button. On the other hand, if the time compression circuit 12 is processing the voice signal every track, unless the stop button or pause button is depressed, the voice signal is newly fetched every recording of one track.

If the single recording mode has been set (S4), step S24 follows. The time compression circuit 12 starts to fetch the voice signal (S24). If the stop button has been depressed (S14), the voice signal of the time compression circuit 12 for a period of time from the depression of the start button (S3 or S20) to the depression of the stop button (S14) is recorded (S15). In this case, a combination of flags which are added to the voice signal is set to type 3. If the pause button has been depressed (S16) without depression of the stop button, the voice signal of the time compression circuit 12 for a period of time from the depression of the start button (S3 or S20) to the depression of the pause button (S16) is recorded (S18). In this case, the recording type is set to type 2. If the time does not reach the time for recording of one track without depression of both of the stop button and the pause button (S17), the processing routine is returned to step S24. If the time has reached the time for recording of one track (S17), the voice signal of the time compression circuit 12 for a period of time from the depression of the start button (S3 or S20) to the elapse of time for recording of one track is recorded (S18). In this case, a combination of flags which are added to the voice signal is set to type 2.

After completion of the recording of one track (S18), the apparatus waits until the stop button or start button is depressed. If the stop button has been depressed (S19), the single recording mode is finished. If the start button has been depressed (S20), the processing routine is returned to step S24 and the fetching of the voice signal is restarted.

Figure 3:
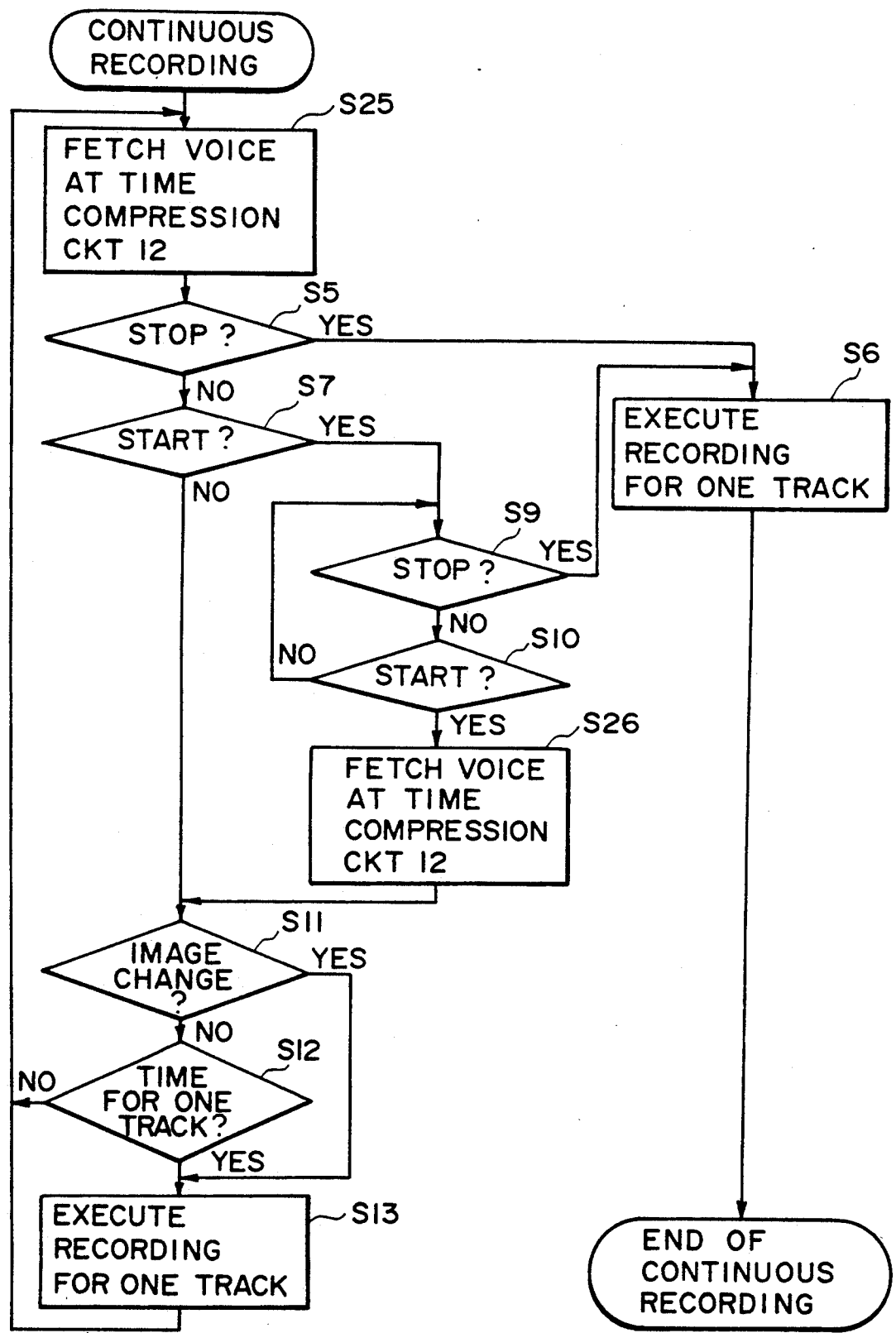
FIG. 3 is a flowchart showing an example of a change of a continuous recording mode.

FIG. 3 shows a flowchart of an example of a change of the continuous recording mode. In the flowchart of FIG. 3, the recording operation (S8) in FIG. 2 in the case where the pause button has been depressed (S7) is omitted. That is, if the pause button has been depressed (S7), the apparatus waits until either the stop button or the start button is depressed. If the stop button has been depressed (S9), the voice signal of one track is recorded (S6) and the continuous recording mode is finished. If the start button has been depressed (S10), the voice signal at the input terminal 10 is fetched (S26) after the voice signal which has already been fetched into the time compression circuit 12.

Figure 4:
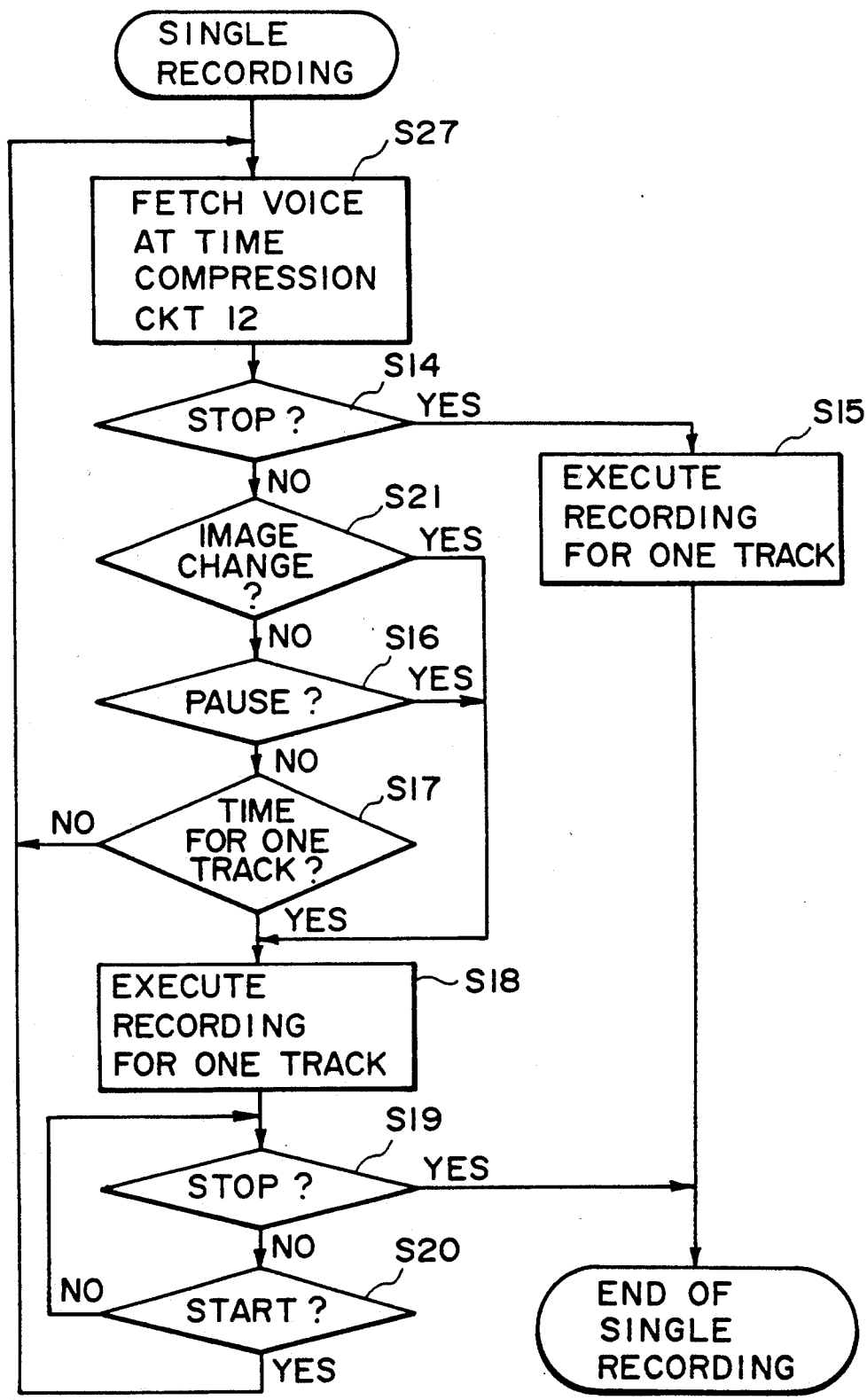
FIG. 4 is a flowchart showing an example of a change of a single recording mode.

FIG. 4 shows a flowchart of an example of a change of the single recording mode. In FIG. 4, change a in image for after-recording is permitted during the process. If the stop button is not depressed (S14), a check is made to see if the image for after-recording has been changed or not (S21). If the image for after recording has been changed, the voice signal of the time compression circuit 12 for a period of time from the depression of the start button (S3 or S20) to the time point in step S21 is recorded (S18). In this case, the recording type is set to type 2. If the image for after-recording is not changed, a check is made to see if the pause button has been depressed or not (S16). After that, the processing routine is executed in a manner similar to the case of FIG. 2.

Although the case of the one track recording has been described above and is, particularly, shown in the drawings, the other processes for feeding tracks, erasing the recorded signal, and the like are also obviously executed. On the other hand, in the single recording mode, the apparatus has been set into the standby mode every completion of the recording onto one track. However, the apparatus may be also set into the standby mode every predetermined number of a plurality of tracks. In the embodiment, the voice signal has been recorded on a track unit basis. However, the invention is not limited to such a case, but the voice signal can be also recorded on a unit basis smaller than the track.

As will be easily understood from the above description, according to the embodiment, in the after-recording mode for after recording a voice, a recording mode to pause by the recording on a unit basis of a predetermined number of tracks and a continuous recording mode to continuously execute the recording operation are provided. Therefore, the operating efficiency for after recording is improved and the desired software can be easily formed. On the other hand, in the embodiment, the operation in the after recording mode has been described. However, the invention can be also similarly applied to the case of merely recording a voice signal. In the embodiment, a magnetic disk-shaped recording medium has been used as a recording medium. However, the invention is not limited to such a recording medium. For instance, it is also possible to use a tape-shaped recording medium, a medium such as an optical disk, a solid state memory such as a semiconductor memory, or the like.

A recording or reproducing method can be also arbitrarily changed in accordance with the kind of memory.

What is claimed is:

1. A recording and reproducing apparatus for use with a memory medium on which a video signal is recorded, comprising:
    reproducing means for reproducing the video signal from the memory medium to produce an image;
    recording means for recording an audio signal into the memory medium in a plurality of memory portions;
    controlling means for controlling said recording means, said controlling means selecting between (1) continual recording of the audio signal, and (2) recording of the audio signal into a single portion of the memory medium followed by setting a stand-by mode; and
    changing means for causing said reproducing means to change an image reproduced by said reproducing means,
    wherein, when the continual recording is selected, said controlling means controls said recording means to divide the audio signal recorded by said recording means in response to a change of the image reproduced by said changing means.

2. Apparatus according to claim 1, further comprising time base compressing means for time base compressing the audio signal.

3. Apparatus according to claim 1, wherein said memory medium comprises a recording medium.

4. Apparatus according to claim 3, wherein said memory portions are formed on said recording medium.

5. Apparatus according to claim 3, wherein said recording medium comprises a disc.

6. Apparatus according to claim 5, wherein said changing means comprises means to cause said reproducing means to change the video signal reproduced by said reproducing means in response to a manual operation.

7. Apparatus according to claim 1, further comprising a change-over switch to manually switch said means for controlling between said continual recording and said single-portion recording.

8. A recording and reproducing method for use with a memory medium on which a video signal is recorded, comprising the steps of:
    reproducing the video signal from the memory medium using a reproducer;
    recording an audio signal on the memory medium using a recorder;
    selecting between (1) continual recording of the audio signal, and (2) recording of the audio signal into a single portion of the memory medium followed by setting a stand-by mode of the recorder;
    changing an image reproduced by the reproducer; and
    controlling the recorder, when the continual recording is selected, to divide the audio signal recorded by the recorder in response to the changing of the reproduced image.

9. A method according to claim 8, wherein the memory medium comprises a recording medium.

10. A method according to claim 9, wherein the recording medium comprises a disc.

* * * * *

UNITED STATES PATENT AND TRADEMARK OFFICE
CERTIFICATE OF CORRECTION

PATENT NO. : 5,311,370
DATED : May 10, 1994
INVENTOR(S) : MAKOTO TAKAYAMA

It is certified that error appears in the above-indentified patent and that said Letters Patent is hereby corrected as shown below:

COLUMN 1:
   Line 55, "after record-" should read --after-record- --.

COLUMN 2:
   Line 18, "in" (both occurrences) should be deleted; and
   Line 29, "to" should read --to the recording--.

COLUMN 3:
   Line 5, "construc-" should be deleted;
   Line 6, "tional" should be deleted; and
   Line 56, "after recording" should read --after-recording--.

COLUMN 5:
   Line 17, "(S9)." should read --(S9),--;
   Line 24, "change a in" should read --a change of--;
   Line 28, "after recording" should read --after-recording--;
   Line 53, "after recording" should read --after-recording--;
   Line 58, "after recording" should read --after-recording--;

UNITED STATES PATENT AND TRADEMARK OFFICE
CERTIFICATE OF CORRECTION

PATENT NO. : 5,311,370
DATED : May 10, 1994
INVENTOR(S) : Makoto Takayama

It is certified that error appears in the above-indentified patent and that said Letters Patent is hereby corrected as shown below:

```
Line 59, "On the other hand, in" should read --In--; and
Line 60, "after recording" should read --after-
recording--.
```

Signed and Sealed this

Twenty-ninth Day of November, 1994

Attest:

BRUCE LEHMAN

*Attesting Officer*     *Commissioner of Patents and Trademarks*